United States Patent [19]

Bayer et al.

[11] Patent Number: 5,716,156
[45] Date of Patent: Feb. 10, 1998

[54] SHAFT FASTENING

[75] Inventors: Thomas Bayer, Igersheim; Werner Hofmann, Bad Mergentheim, both of Germany

[73] Assignee: Alpha Getriebebau GmbH, Igersheim, United Kingdom

[21] Appl. No.: 765,516

[22] PCT Filed: Mar. 8, 1996

[86] PCT No.: PCT/DE96/00440
§ 371 Date: Dec. 30, 1996
§ 102(e) Date: Dec. 30, 1996

[87] PCT Pub. No.: WO96/35885
PCT Pub. Date: Nov. 14, 1996

[30] Foreign Application Priority Data

May 11, 1995 [DE] Germany ............... 195 17 258.2

[51] Int. Cl.$^6$ ............................................. F16B 11/00
[52] U.S. Cl. .................. 403/282; 403/280; 403/359
[58] Field of Search ........................ 403/282, 279, 403/280, 359

[56] References Cited

U.S. PATENT DOCUMENTS 3,396,554  8/1968  Westercamp.
4,416,564  11/1983  Billet et al. .................. 403/282
4,886,392  12/1989  Iio ................................ 403/282
5,158,390  10/1992  Ito et al. ..................... 403/282
5,309,620  5/1994  Shinohara et al. ........... 403/282 X

FOREIGN PATENT DOCUMENTS

A 0661474   7/1995   European Pat. Off. .
A 2925058   1/1980   Germany .
43 45099A1  7/1995   Germany .

Primary Examiner—Thomas R. Hannon
Attorney, Agent, or Firm—Collard & Roe, P.C.

[57] ABSTRACT

In a shaft fixture in which a toothed and especially knurled region (B) of a shaft (2) is pressed into a drilling (3) in a seat (4) to form a positive fit with great centric precision via two separate centering sections (A, C), the solidity of the fixture is to be increased in that the shaft has a toothed region (D) outside the section to be introduced into a securing drilling. This toothed region may in particular be a pinion (1) which is pressed via a shaped shaft (2) with a hurled region (B) into a seat drilling (3) to provide a positive fit. To this end the end sections of the gaps between the teeth in the pinion region (D) can terminate in the adjacent shaft region (C) so that the diameter of the shaft may be made larger in relation to that of the pinion than if the sections did not so terminate.

4 Claims, 1 Drawing Sheet

SHAFT FASTENING

The invention relates to a shaft fastening according to the preamble of patent claim 1. It may also relate to a shank fastening instead of a shaft fastening.

Such a shaft fastening is described in German patent application P 4345099.7. This type of fastening allows a centric reception of the shaft to be fastened, in particular a pinion shank, within a receiving part with very high accuracy. The high centering accuracy is achieved in that, while the toothed shaft region B is cutting into a corresponding bore portion B' of a receiving part, the shaft is simultaneously guided centrically in the bore in front of and behind this portion. For this purpose, the bore of the receiving part and the fastening region of the shaft are divided into three portion A', B', C' and A, B, C respectively. At the same time, the three regions of the bore must in each case have different diameters which decrease in the joining direction. On the shaft, only the regions B and C, on the one hand, and A, on the other hand, must have diameters which are different from one another.

During the joining operation, the toothed region B of the shaft is drawn into the bore of the receiving part in addition to the region A. This is carried out in that the shaft, in the toothed region B, bears and is guided centrically with an accurate fit, via its tip circle portion, in the bore region C', until the shaft region B has cut completely into the associated bore region B'. In proportion as the guiding length of the shaft region B within the bore region C' decreases during the joining operation, the shaft region C engages with increasing length as centering ensuring an accurate fit.

When a genetic shaft having shaft regions B and C of equal diameter is being fastened, the following two joining variants are possible.

a) The shaft region B is centered first in the bore region C'. Centering of the shaft region A begins only after the operation of cutting into the bore region B' has commenced. The centering of the shaft region C commences only after the shaft region B has begun to cut into the bore region B'. The condition for this version is:

A is smaller than B'.

b) The shaft region B cuts in simultaneously with the centering of the shaft regions B and/or C, on the one hand, and A, on the other hand. This presupposes that A is larger than B'.

As regards the generic shaft fastening, the invention is concerned with the problem of making it possible to design an equal diameter of the shaft regions B and C, in the case of a shaft region D with a toothing having a predetermined tip circle and root circle, to be as large as possible. The aim to design the regions B and C with as large a diameter as possible stems from the need to be able, in this region, to ensure as high strength, specifically, in particular, torsional strength as possible.

This problem is solved by designing the shaft regions B and C according to the defining features of patent claim 1.

This solution is based on the notion that the tooth spaces of the toothing are allowed to run out of the region D into the shaft regions B and C. In the initially mentioned version of a generic shaft fastening according to the older patent application, an equal diameter of the regions B and C was always designed in such a way that it was smaller than the root circle radius of the toothing of the region D. The reason for this was that an encroachment of the tooth spaces of the region D into the shaft regions B and C was considered as to be avoided without fail.

The essence of the present invention is that the opposite has been found appropriate here. Proceeding from this fundamental discovery, the region B of the shaft is designed with a hurling for cutting this region into the clearance of a connecting part, said clearance being circumferentially restricted solely to the regions which are located between the tooth spaces originating from the region D. This means that the relevant tooth space regions in the portion B make no contribution to the hurled connection within the receiving bore of the part to be connected. However, the strength of the connection is not impaired thereby, since the diameter of the region C can be selected to be so large that the remaining material is of sufficient size for receiving the knurling. By virtue of the solution according to the invention, it is even possible, despite the tooth spaces, to design the material region occupied by knurling to be larger than in the case of a diameter which is below the root circle diameter of the toothed region D.

In the version according to the invention, no relief groove is required between the adjacent regions C and D. Instead, the region C merges into the flanks of the toothing of the region D via a radius.

The axial length of the nonknurled region C is expediently greater than 10% of the common diameter of the regions B and C. It is even more advantageous if this region measures more than 20% of the above-mentioned diameter.

An exemplary embodiment is illustrated in the drawing, in which.

The shaft fastening or shank fastening illustrated is the special case of a centrically accurately fitting pinion shank fastening in the production of a play-free planetary gear. A pinion 1 is provided with a shank 2 in each case for this purpose. The pinion 1 is to be inserted by means of the shank 2 into the bore 3 of a receiving part 4 so as to have an accurate fit.

The shank is divided along its length in three part regions, specifically, as seen from its free end, into a first fitting region A, a subsequent toothed region B and a fitting region C directly adjacent to the pinion 1. The toothing of the region B is a knurling.

The bore of the receiving part is divided in the regions A', B', C' which correspond functionally to the shank regions A, B, C, their diameters in each case increasing, as seen in the alphabetic order of these regions. The region of the pinion 1, with which the latter meshes in rotating mating gearwheels, is designated by D.

When the shank 2 of the pinion 1 is pushed into the bore 3 of the receiving part 4, the shaft region B cuts into the associated bore region B' at the same time as the shaft is centered in the regions A and B, said centering already occurring before the cutting-in operation commences. In this case, the region B of the shaft serves for centering in addition to the centering region A merely at the commencement of the cutting-in operation. As soon as the region B has penetrated by cutting over a particular length into the bore region B', the shaft region C engages as an additional centering region to A. As long as the region C of the shaft has not yet penetrated completely into the receiving region C', the shaft region B located outside the bore region B' in the bore region C' also still carries out centering.

Figure 1:
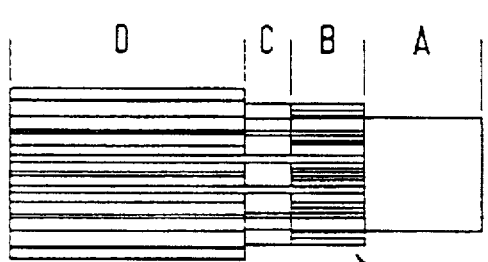
FIG. 1 shows a view of a pinion with two shank regions having different diameters and serving for fastening.
Figure 2:
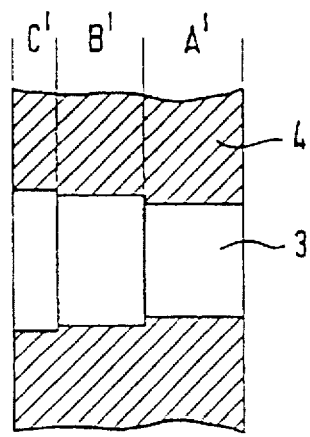
FIG. 2 shows a section through the bore of a receiving part for receiving the pinion shank according to FIG. 1.
Figure 3:
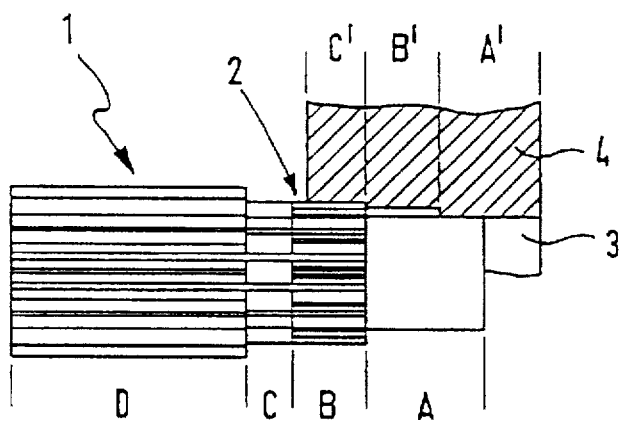
FIG. 3 shows a section through a pinion shank partially introduced into the bore of a receiving part.
Figure 4:
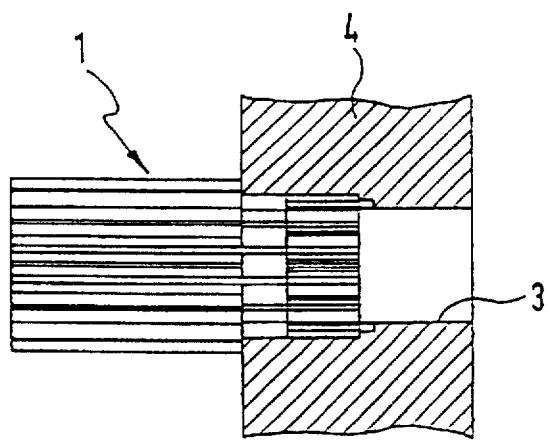
FIG. 4 shows a section through a pinion shank inserted completely into the bore of a receiving part.
Figure 5:
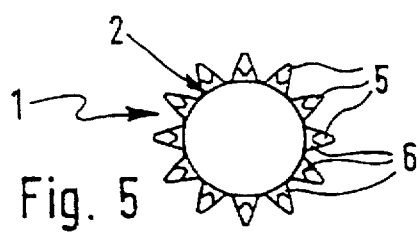
FIG. 5 shows a view of the pinion towards the region A.

It can be seen from FIG. 5 to what extent the tooth spaces project in radial depth out of the root region of the toothing of the pinion 1 in the region D into the shaft regions C and B. The teeth of the toothing in the region D are designated by 5, whilst the knurled toothing in the region B is identified by the reference symbol 6.

The shaft region C merges into the teeth 5 of the toothing of the region D of the pinion 1 via small radii.

As result of the axial length of the shaft region B, the connection between the pinion and the receiving part 4 has high strength. This results, on the one hand, from a relatively large equal diameter of the regions C and B and, on the other hand, from the fact that a relatively long compensating region C is present in the transitional region between the knurled region B and the pinion region D for the torsional and bending stress which occurs in the connection. This compensating region has a considerable strength-increasing effect for the shaft fastening.

We claim:

1. A fastening of a shaft in a bore of a receiving part, having the features
   a) the shaft possesses three axial portions A, B+C and D which are adjacent to one another in the alphabetic order of the letters designating them and of which the portion D has the largest and the portion A the smallest outside diameter, and in which the part regions B and C of the region B+C are designed with an equal outside diameter,
   b) on the shaft, the portion D and, of the portion B+C, at least the part region B are designed to be toothed and hurled respectively,
   c) the bore (3) of the receiving part (4) is divided into three regions A', B' and C', axially adjacent to one another and having diameters increasing relative to one another, commencing with the region A' of smallest diameter, into which the shaft is introduced with its region A,
   d) the identically lettered regions A and part regions B and C of the shaft (shank 2) and of the bore (3) are assigned to one another when the shaft (shank 2) is fastened in the receiving part (4),
   e) the shaft regions or part regions A and C bear with an accurate diametrical fit in the associated bore regions A' and C',
   f) when the shaft (shank 2) is fastened in the receiving part (4), said shaft is cut positively with its toothed or hurled part region B into the bore region B' by means of the joining operation,
defined by the two features:
   g) the tooth spaces of the toothing of the region D extend continuously, in their root zones, over the regions C and B,
   h) in the region B of the shaft, the regions located circumferentially between the tooth spaces running out of the region D into the region B are provided with a toothed or hurled profile.

2. The shaft fastening as claimed in claim 1, wherein the width of the shaft portion C measures at least 10% of the diameter of this region.

3. The shaft fastening as claimed in claim 2, wherein the width of the shaft portion C measures at least 20% of the diameter of this shaft region.

4. The shaft fastening as claimed in claim 1, wherein the shaft region C merges into the teeth of the region D via a radius.

* * * * *